Jan. 17, 1967  A. J. HELLEMANS  3,298,890
APPARATUS FOR JOINING WEBLIKE MATERIAL

Filed Nov. 12, 1963  2 Sheets-Sheet 1

INVENTOR

ALBERT JOSEPH HELLEMANS

BY Homer R. Montague

HOMER R. MONTAGUE  ATTORNEY

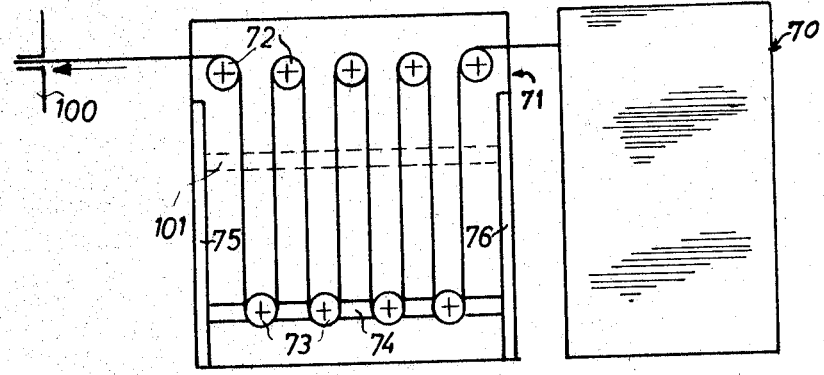
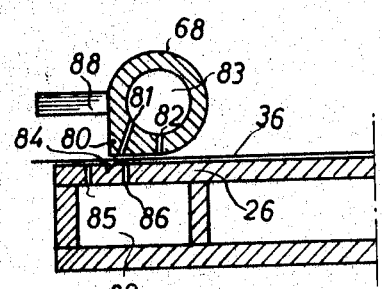
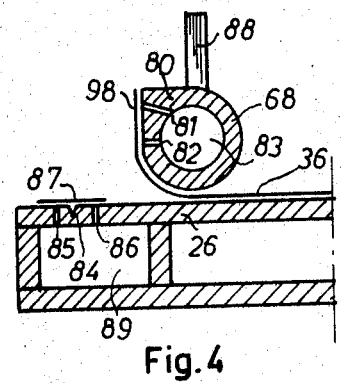
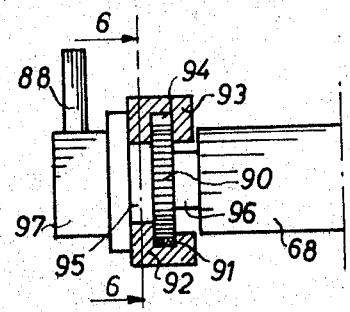
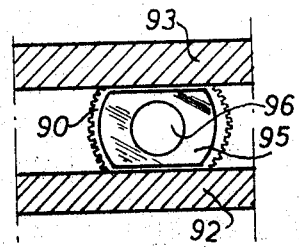
Fig.2 / Fig.3 / Fig.4 / Fig.5 / Fig.6

United States Patent Office

3,298,890
Patented Jan. 17, 1967

3,298,890
APPARATUS FOR JOINING WEBLIKE MATERIAL
Albert Joseph Hellemans, Berchem-Antwerp, Belgium, assignor to Gevaert Photo-Producten N.V. Mortsel-Antwerp, Belgium, a Belgian company
Filed Nov. 12, 1963, Ser. No. 323,547
Claims priority, application Netherlands, Nov. 13, 1962, 285,406
13 Claims. (Cl. 156—504)

The present invention relates to an apparatus for joining webs by means of adhesive tape. The expression "web" is used herein to denote shape and is not limited to any particular material. The invention can be applied to the joining of webs of paper, plastics and a variety of other materials.

When in photographic and other industries operations such as the application of a coating layer, have to be performed on a continuously travelling web drawn from a roll, it is necessary to fix the end of the receding web to the beginning of the new web so that the coating or other operation can be performed continuously.

In the photographic industry, when web coatings are to be metered by means of an air knife, it is further desirable to join the webs in close end-to-end abutting relationship, otherwise the coating of the web is likely to involve considerable economic losses. A considerable increase of the thickness of the webs at the place of the joint e.g. as a consequence of their ends being overlapped, gives rise to considerable disturbances of the air blast when the joint passes the air knife, causing thereby irregularities in the coated layer, which may even extend over a distance of some meters.

It is known to butt joint webs by means of a self-adhesive tape applied by hand.

The performance of this method takes appreciable time and, if one does not wish to interrupt the continuous movement of the web, this method necessitates the use of a large capacity accumulator in the feed path of the webs for permitting the trailing end of a web to be temporarily arrested for the required time without interrupting the continuous movement of web from the accumulator device.

The object of the present invention is to provide an apparatus by which a web can be joined to a continuously feeding web in a very short time so that accumulator devices of such large capacity are not necessary.

Another object of the present invention is to provide an apparatus by means of which strong and exact joints can be produced which in passing the material between e.g. calendering rollers, will not be loosened or damaged.

Still another object of the present invention is to provide an apparatus that can be practiced fully reliable under dark-room conditions.

Apparatus according to the invention for joining one web to another which is in course of being continuously fed comprises an accumulator device via which a web can be progressively fed from a roll and which in operation allows web accumulated in the device to be drawn off while the feed of such web to the device is temporarily arrested, means whereby such arrest may be effected, a web support equipped for holding an appropriately cut trailing end portion of a web, during temporary arrest as aforesaid, with its trailing edge at a predetermined position in relation to such support, a second web support which is equipped for holding an appropriately cut leading end portion of a further web with its leading edge at a predetermined position in relation to this second support, at least one of the said supports being equipped for achieving its said hold of a web portion while leaving this portion exposed on one side, and said supports being relatively displaceable in a plane normal to the planes occupied by the end portions of webs when held by said supports as aforesaid, into relative positions in which such trailing and leading web end portions are in registering end-to-end co-planar relationship, means which may be associated with or form part of a said support equipped for holding a length of adhesive tape in a flat condition and which is mounted for displacement simultaneously with or subsequent to said relative displacement of the said web supports for bringing a piece of tape into a position in which it overlaps and unites the two registering web edges on the side of the webs corresponding to said exposed side of a web end portion, and means for automatically operating said web and tape supporting means to bring about such union of the webs during a said period of temporary arrest of the trailing end portion of a web being continuously drawn from the accumulator device.

Preferred but optional features of the invention are as follows: Only the support for the new web is movable in the actual operation of joining the webs. A web-cutting device is associated with the support for the trailing end portion of the web which is in course of being fed, so that the formation of the trailing edge for butt-jointing to the new web takes place automatically at the correct position in relation to the support for such trailing edge. The support for the new web is equipped with a vacuum system for holding a length of adhesive tape and the leading end portion of the new web is secured onto half the width of this tape as a preliminary operation at any convenient time so that the new web support holds both tape and web in readiness for the operation whereby the projecting portion of the tape is secured to the trailing end portion of the receding web. In order that the projecting portion of tape can be secured to the trailing end portion of the receding web, this latter portion must be held in such a way that it is exposed on one side. This may be achieved by constructing the support for the trailing end of the old web in two component parts only one of which supports the web immediately adjacent its trailing edge extremity. This extreme trailing edge portion and the adhesive tape portion to be secured thereto can then be gripped between this one component part of the web support and the support for the adhesive tape.

It is ocnvenient for the support for the new web to form a table for the operations of locating first a piece of tape thereon and then the leading end portion of a new web. In order to reduce the distance over which this tape has to be moved for the actual operation of joining the webs, the control mechanism may be constructed so as to move the table in a preliminary operation, into a position closer to the other web. This is conducive to further reduction of the "arrest" period, with consequential reduction in the necessary size of the accumulator device.

An embodiment of the invention, selected by way of example, will now be described with reference to the accompanying drawings, in which:

FIG. 2 shows an accumulator device in connection with the apparatus according to FIG. 1.

FIG. 3 is an enlarged cross section of a part of the preparative device in its first position.

FIG. 4 shows a part of the preparative device in its second position.

FIG. 5 is an enlarged longitudinal section of the guide mechanism of the preparative cylinder.

FIG. 6 is a section of the guide mechanism on the line 6—6 of FIG. 5.

In the following description identical parts situated at the left hand and the right hand side of the plane of the longitudinal section of the apparatus, are referred to by the same numerals.

Figure 1:
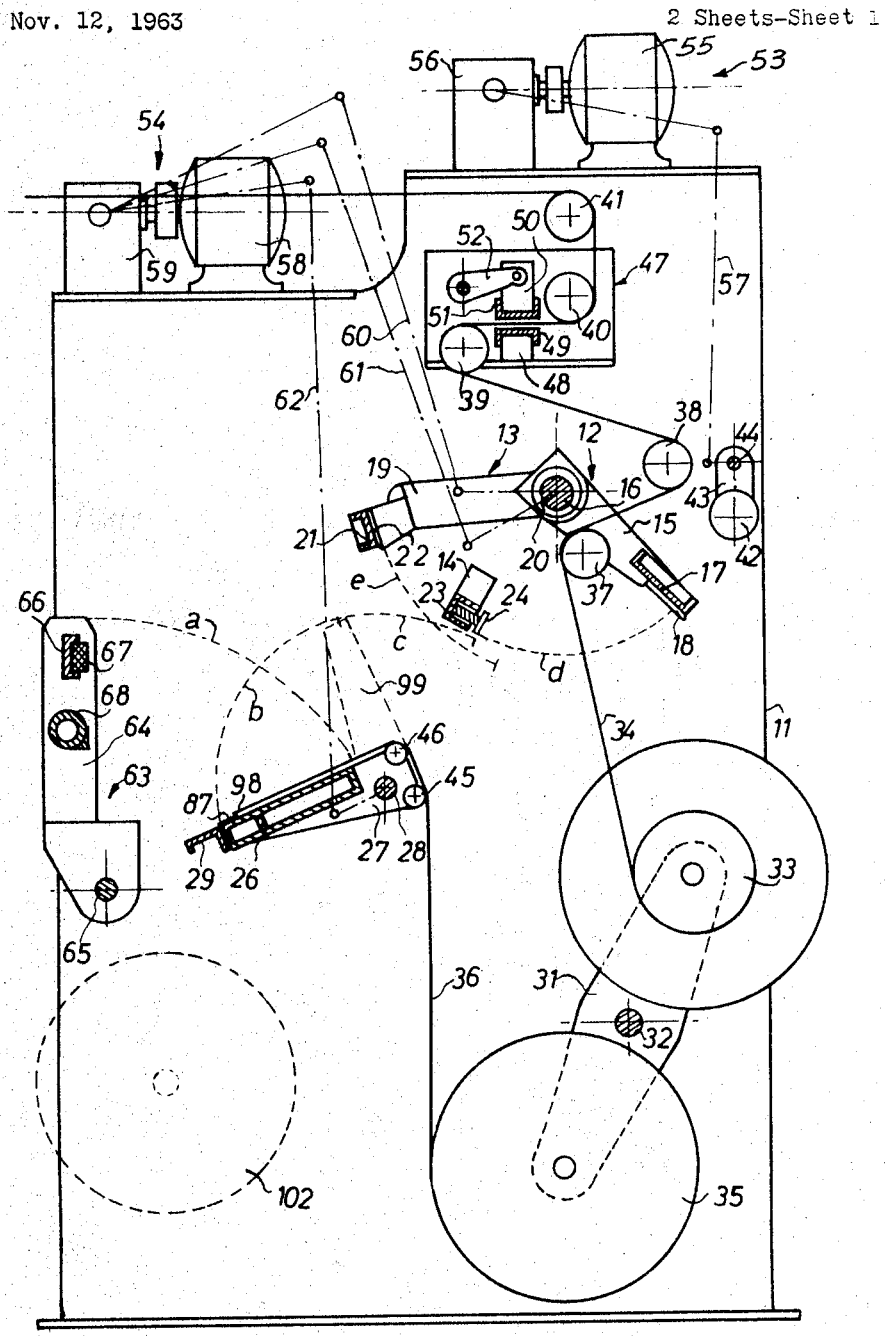
FIG. 1 is a diagrammatic longitudinal section of an apparatus according to the present invention.

The apparatus for joining paper webs represented in FIG. 1 has two upstanding side walls 11, between which and to which the different parts of the apparatus are mounted.

The apparatus comprises an arrest device or stopping device 47 for temporaily arresting or stopping the receding paper web 34. Said arrest device consists of a lower bar 48 covered with a rubber strip 49 and a vertically movable upper bar 50 covered with a strip 51. The movement of the bar 50 is effected by the pivotable arms 52.

The apparatus comprises further a cutting device for supporting and cutting the receding web, comprising a first support member 12, a cutting member 13 and a second support member 14.

The support member 12 consists of two arms 15, which are secured to the extremities of a rotatable shaft 16 and which are mutually connected to each other by a transverse bar 17, onto which a blade 18 is fixed.

The cutting member 13 consists of two arms 19 which are secured to the extremities of a hollow shaft 20 rotatable about the shaft 16, and are mutually connected by a transverse bar 21 bearing a knife 22.

The support member 14 consists of a stationary U-shaped transverse bar 23, to which a transverse rail 24 is fitted by means of the springs located in the U-shaped bar 23.

The apparatus comprises also a pivoting table 26. This table consists of a transverse support mounted between two arms 27, which are attached to the extremities of a rocking shaft 28. In its bottom position the table 26 is aligned with a stationary bar 29.

The apparatus comprises further a web roll holder comprising two arms 31 which are mounted so as to pivot about the trunnions 32. This roll holder holds the roll 33 carrying the receding paper web 34, and a roll 35 carrying the new paper web 36 to be joined.

The receding paper web 34 is guided through the apparatus over the free rotating rollers 37, 38, 39, 40 and 41. The roller 38 is a counter-roller with which a bodily displaceable pressure roller 42 can co-operate. The roller 42 is freely rotatable between arms 43 which are fitted on the extremities of a rotatable shaft 44.

The new paper web 36 is guided to the pivoting table 26 over the free rotating rollers 45 and 46 which are also located between the arms 27.

The control means 53 and 54 are mounted on supports provided on one of the lateral sides of the apparatus. The means 53 controls the bodily movements of the pressure roller 42, while the means 54 controls the movements of the blade 18, the knife 22 and the pivoting table 26.

The control means 53 comprises an electric motor 55, and a gear box 56 with one cam controlling the movement of the rod system 57.

The control means 54 comprises an electric motor 58, and a gear box 59 with three cams controlling the movement of the respective rod systems 60, 61 and 62.

Finally, the apparatus according to the present invention comprises also a preparative device 63 by means of which the preparative operations on the pivoting table 26 can be performed in a simple and exact way.

The preparative device 63 comprises two arms 64, which are fixed to the extremities of a rotatable shaft 65 and which are mutually connected to each other by a U-shaped transverse bar 66 accommodating a rubber strip 67. Between the arms 64 a hollow cylinder 68 is positioned for facilitating the fixing of the adhesive tape onto the new paper web.

The cylinder 68, represented in detail in the FIGS. 3 and 4, is a cylinder which is provided over the full length of its outside periphery with a rectangular projection 80. The cylinder is further provided with two series of openings 81 and 82, and the paper web 36 (which in the interest of clarity is shown as if it were spaced from the cylinder 68 and the table 26) can be held to the cylinder by means of a vacuum produced in the interior 83 of cylinder. The table 26 is provided over its full width with a groove 84 for guiding a knife to cut the web. The table 26 is also provided with two series of openings 85 and 86 and the adhesive tape 87 can be held against the table in substantially flat condition by a vacuum created in the space 89. At one extremity the cylinder 68 is provided with a lever 88 by means of which the cylinder can be turned through 90°. The rotary motion of the cylinder is accompanied by a movement of translation parallel to the plane of the table 26. This latter movement is controlled by the two pinions 90 mounted at either side of the cylinder 68. Each of said pinions 90 (FIG. 5) engages a rack 91 which is fitted in a recess of the lower guide member 92. The upper guide member 93, running parallel to the lower guide member 92 has a recess 94, allowing the free movement of the pinion 90.

The cylinder 68 is guided by a bronze guide piece 95, in which the narrower end portion 96 of the cylinder is rotatably mounted. This bronze guide piece makes a close sliding fit between the guide members 92 and 93. The lever 88 is attached to an enlargement 97 on one of the extremities of the cylinder 68.

The other extremity of the cylinder 68 is provided with an appropriate connection for creating a vacuum in the interior 83 of the cylinder 68.

The apparatus according to the present invention, which is represented in FIG. 2 by the block 70, is followed by an accumulator device 71. This accumulator device comprises an upper series of free-rotating rollers 72, the axes of which are stationary, and a lower series of free-rotating rollers 73, the shafts of which are fitted into a movable frame 74. The frame 74 is vertically displaceable between the guides 75 and 76. In the figure the frame is represented in its lower position.

The operation of the apparatus is as follows:

A paper web 34 with a width of 1.20 m. and a specific weight of 90 g./sq. m. is unwound from the roller 33 at a speed of 150 m./min. and transported to installations where the web is baryta-coated and where this baryta-coated layer is dried. During the unwinding of the roller 33 the new paper web 36 of the roller 35 is prepared for attachment to the old web 34.

This preparation is effected as follows:

The operator who stands at the left hand side of the device 63 (in the aspect of FIG. 1) pulls the paper web 36 of the roll 35 over the rollers 45 and 46 and over the table 26 to a position beyond the fixed bar 29. Then he lowers down the device 63 over the path $a$ onto the table 26. By this operation the paper web 36 is firmly pressed against the surface of the table by means of the rubber strip 67 and the cylinder 68, the cylinder 68 taking the position as illustrated in FIG. 3. Next the operator draws a sharp knife through the paper web, along the groove 84, using the vertical face of the rectangular projection 80 of the cylinder as a guide for the knife. The end cutting of the web falls down off the bar 29 and is discarded. The axis of the cylinder 68 and the groove 84 are not normal to the longitudinal axis of the paper web but make an angle of 85° with respect to this longitudinal axis.

The operator now opens a valve (not represented in the drawings), which connects a vacuum line with the space 83 of the cylinder 68, so that the front edge of the paper web 36 is sucked against the horizontal part of the projection 80. Then he puts the lever 88 into the vertical position, so that the cylinder 68 rolls backwards through 90° (FIG. 4). The front edge 98 of the paper web 36 is thus lifted from the table 26. The operator now pulls a strip of the self-adhesive tape 87 from a roll (not shown in the figures) positioned beside the table, and places this tape with its back side facing downwardly onto the table in such a way that the centre line lies nearly above the groove 84. Then he opens a second valve which creates a vacuum in the space 89 so that the strip of adhesive tape is firmly maintained against the upper face of the table 26.

Then the operator resets the lever 88 into its horizontal position so that the front edge 98 of the paper web 36 is pressed onto half of the strip of adhesive tape 87. Next, he removes the vacuum in the cylinder 68 and brings the preparative device 63 back into its vertical position (FIG. 1). Finally the operator causes the table 26 to swing clockwise in the aspect of FIG. 1, along the path $b$, through about 90°, until the table reaches the position 99 indicated diagrammatically by the dotted lines. When the table 26 has reached this position, the lever system 62 is coupled to the table 26 by engaging a coupling (not shown in the drawings) which is provided on the extremity of the shaft 28. The further movement of the table will now be performed automatically by the control means 54. The adhesive tape 87 together with the leading edge 98 of the paper web 36 are still maintained in the required position on the table surface by the vacuum. The preparative stage is now complete.

During these preparative operations the unwinding of the paper web 34 has continued at a uniform speed.

When the operator notices that the web material on the roll 33 has almost been used up, he operates a brake consisting of stationary jaws, which engage on a steel disk rotating together with the shaft of the roll 33 so that the speed of the roll 33 is slackened and stopped. Next, he pushes a button operating the control means so that from that moment all operations are performed automatically.

First, the stopping means 47 is closed whereby the immobility of the paper web 34 even after releasing the brake is secured. For operating the levers 52 any known type of mechanism such as solenoids, vacuum or overpressure devices, and so on, may be applied.

Next, the motor 58 is started, whereby the cams in the gear box 59 operate sequentially the various rod systems. First, the rod system 60 is lifted up whereby the support member 12 is pivoted over the path $d$ to the left. During this movement the blade 18 displaces the web 34 so that the latter becomes gripped between the rail 24 and the left hand flat side of the blade 18. The spring biased rail 24 secures a firm and uniform pressing of the web. Next the rod system 60 moves downwardly and immediately upwardly again. During the downward movement of system 60 the cutting member 13 is pivoted in downward direction so that the knife 22 follows the path $e$ and skims past the edge of blade 18 thereby cutting off the remaining part of the paper web 34. The edges of both knives form an angle with the normal to the longitudinal axis of the web, this angle being equal to the angle of the cut of the web 36. Finally the third rod system 62 moves upwardly so that the table 26 pivots clockwise from the position 99 along the path $c$. At the end of the path $c$ the part of the table 26 on which the exposed projecting half of the adhesive tape 87 is lying presses this tape portion against the end portion of the old web which lies against blade 18 and projects below rail 24. The joining of the webs is thus effected.

Then the table 26 returns to the position 99, the control means 53 pulls the roller 42 against the counter-roller 38, the support member 12 pivots back to the right hand side, and finally the operator opens the stopping means 47. The adhesion of the joint to the webs is so strong that the joint is released from the table 26 when this table pivots back to the position 99, even if the vacuum in the space 89 of the table 26 is not removed.

Now the "arrest" period has ended and the paper web 36 slowly starts moving. The butt-joint between the webs 34 and 36, passes between the pair of pressure rollers 38, 42 so that it is once more firmly pressed. The roller 42 is then restored into the free position by the control means 53.

The overall time for stopping the paper web amounts to 5 sec. During this short period the paper web travels at a constant speed of 150 m./min. in point 100 (FIG. 2). The length of paper web drawn off during this stoppage period i.e. 12.5 m., is ceded by the accumulator device 71. The frame 74 has taken thereby the position 101 indicated by dash lines. When the stopping means 47 has released the paper web and the roller 35 slowly starts rotating, the frame 74 of the accumulator device still moves upwardly for a while until the speed of the paper web 36 before the accumulator amounts to 150 m./min. Then the frame 74 will slowly lower down by its own weight or by hydraulic or other means increasing thereby the speed of the web before the accumulator until finally the frame has again taken its lowest position.

The operator uncouples the pivoting table 26 from the rod system 62 and swings the table from the position 99 to the stationary bar 29, so that the table takes up again its initial position, shown in FIG. 1.

The roll holder 31 is now turned through 180°, so that the roll 35 takes up the position formerly occupied by the empty roll 33. The core of the roll 33 is removed and a new roll 102 is fitted between the arms 31.

During the unwinding of the new paper web 36 of the roll 35 there is the opportunity for the operator, as described hereinbefore, to carry out the preparative operations on the paper web of the new roll 102, for the purpose of joining it later on to the extremity of the paper web 36.

With the described apparatus a very firm joint is obtained presenting no risk for loosening. Speeds up to 200 m./min. may be applied without any risk.

After the web has been baryta-coated, it is conveyed into a drying room, where it is dried at a temperature of 50° C. and at a degree of relative humidity of 40 to 45%.

After leaving the drying room the continuously moving web is rewound onto rolls. For this purpose an accumulator and a stopping device are provided between the drying room and the winding up apparatus, whereby it is permitted to stop the movement of the web for a short while. The stopping device is operated by the operator at the moment he notices the arrival of a joint. When the web stops, the joint is quickly cut away and the extremity of the web originating from the drying room is attached to the core of the new, i.e. empty, roller whereafter the web is restarted and continues to travel until the operator notices a following joint. The different rolls are stored until they have to undergo a further treatment such as applying a light-sensitive emulsion (e.g. for manufacturing photographic enlarging paper), coating a nuclei-containing layer (e.g. for manufacturing positive material used in the reproduction according to the silver halide diffusion transfer process), etc.

As the most important requirement for the adhesive tape is a strong adhesive power. The adhesive tape must not slide off when the new web starts to move under the tension in the receding web after the webs have been joined. Further the adhesive tape must be resistant to moistening which arises during the baryta-coating. The direction of the joint i.e. obliquely with respect to the width of the web, contributes to limit the load to which the joint is subjected when the web bends over guide rollers.

It is quite clear that the properties required for the adhesive tape depend on the field of application.

The most important factors which have to be taken into account when chosing an adhesive tape for a determined application are: the temperature whereto the joint will be subjected, the speed of the web, the kind of the material of the web, the surface of the web, the specific weight of the web, the moistening, and the chemical action between the adhering substance of the adhesive tape and the web.

In the described example webs were dealt with which had to be baryta-coated. It is clear that the apparatus of the present invention is also appropriate for joining together paper webs preparatory to coating with other kinds of layers, such as light-sensitive layers, antihalation layers, antistress layers, etc. The present apparatus is likewise appropriate for joining film webs which have to be submitted to similar operations.

Further the apparatus according to the present invention is suitable for joining to each other paper webs, webs of fabrics, plastic webs, metal webs, etc., which have to be printed, coloured, dried, shaped, profiled, etc. in a continuous way, such as e.g. wall paper, floor coverings, wrapping materials, etc.

In the described example the braking of the speed of the expiring web was performed mechanically. It is evident that for this purpose also other devices, such as magnetic or electronic brake systems can be considered, which are well known in this field.

The braking operation is not in all cases necessary; when low speeds are used, e.g. 10 to 20 m./min. and the accumulator consists of only one vertically movable guide roller, the stopping device 47 is capable upon closing to interrupt the movement of the web immediately, without the necessity of previously braking the roller containing the expiring web.

It is evident that in place of control means 53, 54 other control means known in the field of automatic apparatus can be employed with the same good results. For instance hydraulic systems, provided with electromagnetic valves, electric systems which comprise an electric motor for each moving part, said motor being controlled by relays and microswitches, said microswitches being operated by cams which are mounted on a common shaft which performs one revolution for one complete operation cycle, etc., can be used successfully.

Many other modifications to the illustrated embodiment are possible within the scope of the invention. For example, a part movable like the member 14 against one side of the receding web may be provided with a vacuum device which takes hold of the web and with a shearing edge along which the web can be cut by a swinging cutter (like cutter 21, 22) movable from the other side of the web. As in that case it would be possible to dispense with a second web-supporting component for clamping the web onto the vacuum support replacing member 14, the bar 17 and blade 18 may be replaced by a vacuum holder for a piece of adhesive tape. By appropriate design of such holder, which could be loaded with tape at any convenient time while the joining mechanism is not in use, the tape would become secured to the old web so that the tape projects for half its width from the web extremity. In that case there would be no need for tape to be loaded on the table 26. The leading end portion of the new web would alone be located on this table and this table and the tape holder on the other side of the web would swing together so as to cause the tape to become secured to the ends of the two webs simultaneously.

Accumulator devices operating as does device 71 are not new per se and apparatus as represented by FIGURE 1, or modifications thereof, can of course be used in conjunction with existing accumulator devices or devices of similar type made to smaller dimensions, comprising e.g. only one vertically movable roller.

The present invention therefore includes apparatus as hereinbefore broadly defined but without an accumulator device and/or without a web-arresting means. It is not essential to provide an arrest device integrated with the joining mechanism as is device 47. For example arrest may be achieved by simply braking a supply roll of the web, which roll may in some cases be mounted outside the cutting and joining apparatus itself.

Due to the firmness of the joint obtained with the apparatus according to the present invention, this apparatus is very well suited for being used in combination with a calendering installation.

In a calendering installation the webs are guided in the known way between pressure rollers which are pressed against each other under high pressure by means of e.g. a hydraulic mechanism. Thereby a very smooth surface is conferred to the web.

In practice, it has hitherto been necessary to stop the calendering installation for each new roll to be treated, because the beginning of the web must be introduced between the calendering rollers by the operator.

When, however, use is made of an apparatus according to the present invention, in connection with an accumulator device, it is possible, provided a suitable adhesive tape is applied, to calender continuously.

In the calendering installations the adhesive tape has obviously to satisfy other requirements than for instance in the installations for the application of a baryta-layer or an emulsion layer.

The most important of these requirements, when an adhesive tape is used in combination with a calendering installation, relates to the adhesive power, the tensile strength and the thickness of the adhesive tape.

It is evident that the risk of the adhesive tape sliding off between a pair of pressure rollers of the calendering installation increases in proportion to the thickness of the adhesive tape.

The adhesive power is a factor having the same importance as in other installations wherein no compression of the joint occurs.

Finally, in practice most attention has to be given to the tensile strength of the adhesive tape. From practical experience it has indeed appeared that the rupture of the adhesive tape happens more often than sliding off. As very appropriate adhesive tapes for joining together webs which have to be guided through calendering installations, thin self-adhesive polyester tapes have to be mentioned.

When using some adhesive tapes and/or webs, it might be necessary to remove temporarily the hydraulic pressure on the rollers of the calendering installation, when a joint is passing therethrough. In this way the risk of rupture or sliding off of the joint is reduced in that the only load on the joint is constituted by the weight of the rollers themselves.

I claim:

1. Apparatus for joining one web to another whilst this is being continuously and progressively fed, said apparatus comprising an accumulator device via which a web is progressively fed from a roll and which in operation allows web accumulated in the device to be drawn off while the feed of such web to the device is temporarily arrested, means whereby such arrest is effected, a web support equipped for holding an appropriately cut trailing end portion of a web during temporary arrest as aforesaid, with its trailing edge at a predetermined position in relation to such support, a second web support which is equipped for holding an appropriately cut leading end portion of a further web with its leading edge at a predetermined position in relation to this second support, at least one of the said supports being equipped for achieving its said hold of a web portion while leaving this portion exposed on one side, and said supports being relatively displaceable in a plane normal to the planes occupied by the end portions of webs when held by said supports as aforesaid, into relative positions in which such trailing and leading web end portions are in registering end-to-end co-planar relationship, means associated with a said support equipped for holding a length of adhesive tape in a flat condition and which is mounted for displacement with said relative displacement of the said web supports for bringing a piece of tape into a position in which it overlaps and unites the two registering web edges on the side of the webs corresponding to said exposed side of a web end portion, and means for controlling said web and tape supporting means to bring about such union of the webs during a said period of temporary arrest of the trailing end portion of a web being continuously drawn from the accumulator device.

2. Apparatus according to claim 1, wherein said second web support is equipped for holding a length of adhesive tape in a substantially flat condition, with its adhesive side exposed, in a predetermined position such that for part of its width the tape underlies the leading end portion of a said further web when this is located on the support with its leading end portion in the required predetermined position.

3. Apparatus according to claim 1, incorporating a cutting device for cutting the arrested portion of a web in course of being fed, thereby to form a trailing edge which lies in the required predetermined position in relation to the said support for the trailing end portion of such web.

4. Apparatus according to claim 3 wherein said cutting device is arranged so as to cut a web at other than 90° to its longitudinal axis.

5. Apparatus according to claim 3 wherein the support for the trailing end portion of a web in course of being fed comprises component parts which operate to clamp such web portion between them, and wherein one of such parts is arranged to support said web up to a trailing position which is outside a boundary edge of the other of such parts and the said cutting device operates after such parts have closed onto a web, to cut the web at said trailing position.

6. Apparatus according to claim 5 wherein one of said component parts provides a spring-loaded clamping face.

7. Apparatus according to claim 2 wherein the said web supports are relatively displaceable into positions in which, in operation of the apparatus, that part of the second web support underlying the adhesive tape portion which projects from the leading edge of the further web, serves to press this portion of the tape against that part of the other web which extends between the said boundary edge and the said trailing position at which such other web is cut.

8. Apparatus according to claim 1 wherein the support for the trailing end portion of a web in course of being fed is constructed and arranged to operate so that this trailing end portion is held stationary during the operation of joining on a further web, and wherein the said second web support is mounted for rocking motion towards and away from the other said support.

9. Apparatus according to claim 8 wherein said second web support is under the control of a mechanism which operates to swing such support (with the leading end portion of a further web held thereon) part of the way towards the trailing end of the web which is in course of being fed, preparatory to a subsequent operation in which the said second web support is moved further in the same direction to effect union of the webs.

10. Apparatus according to claim 1 wherein the second web support is equipped with a vacuum system for holding the leading end portion of a web thereon.

11. Apparatus according to claim 1 wherein the second web support has associated therewith means for guiding a cutting knife to facilitate cutting a web, while on the said support, to form a leading edge at an appropriate position in relation to the support.

12. Apparatus according to claim 1 comprising a releasable pressure roller for rolling a web joint after its formation.

13. Apparatus for joining one web to another whilst this is being continuously and progressively fed, said apparatus comprising a web support equipped for holding an appropriately cut trailing end portion of a web, with its trailing edge at a predetermined position in relation to such support, a second web support which is equipped for holding an appropriately cut leading end portion of a further web with its leading edge at a predetermined position in relation to this second support, at least one of said supports being equipped for achieving its said hold of a web portion while leaving this portion exposed on one side, and said supports being relatively displaceable in a plane normal to the planes occupied by the end portions of webs when held by said supports as aforesaid, into relative positions in which such trailing and leading web end portions are in registering end-to-end co-planar relationship, means associated with a said support equipped for holding a length of adhesive tape in a flat condition and which is mounted for displacement with said relative displacement of the said web supports for bringing a piece of tape into a position in which it overlaps and unites the two registering web edges on the side of the webs corresponding to said exposed side of a web end portion, and means for controlling said web and tape supporting means to bring about such union of the webs.

References Cited by the Examiner
UNITED STATES PATENTS

| | | | |
|---|---|---|---|
| 2,606,136 | 8/1952 | Garrett et al. | 156—504 |
| 2,745,464 | 5/1956 | Auerbacher et al. | 156—504 |
| 2,991,827 | 7/1961 | Hendrich et al. | 156—504 |

EARL M. BERGERT, *Primary Examiner.*

D. J. DRUMMOND, *Examiner.*